(12) United States Patent
Kauhanen et al.

(10) Patent No.: US 9,292,115 B2
(45) Date of Patent: Mar. 22, 2016

(54) APPARATUS AND METHOD FOR DETECTING USER INPUT

(71) Applicant: Nokia Corporation, Espoo (FI)

(72) Inventors: Petteri Mika Kauhanen, Espoo (FI); Tommi Tapio Niemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 294 days.

(21) Appl. No.: 13/680,261

(22) Filed: Nov. 19, 2012

(65) Prior Publication Data

US 2014/0139444 A1      May 22, 2014

(51) Int. Cl.
*G06F 3/041*      (2006.01)

(52) U.S. Cl.
CPC .............. *G06F 3/041* (2013.01); *G06F 3/0414* (2013.01); *G06F 2203/04105* (2013.01)

(58) Field of Classification Search
CPC ................... G06F 3/0414; G06F 2203/04105; G06F 3/044
USPC .................................................. 345/173–178
See application file for complete search history.

(56) References Cited

U.S. PATENT DOCUMENTS

| | | | | |
|---|---|---|---|---|
| 6,002,389 A * | 12/1999 | Kasser | ........................... | 345/173 |
| 2008/0246723 A1 | 10/2008 | Baumbach | .................... | 345/156 |
| 2009/0151475 A1 * | 6/2009 | Masaki et al. | ............. | 73/862.68 |
| 2009/0309616 A1 * | 12/2009 | Klinghult et al. | ............. | 324/686 |
| 2010/0024573 A1 | 2/2010 | Daverman et al. | ............ | 345/174 |
| 2010/0110038 A1 * | 5/2010 | Mo et al. | ........................ | 345/174 |
| 2011/0023631 A1 | 2/2011 | Sleeman | ...................... | 29/592.1 |
| 2011/0037721 A1 | 2/2011 | Cranfill et al. | ................. | 345/174 |
| 2011/0279409 A1 * | 11/2011 | Salaverry | .............. | G06F 3/0416 345/174 |
| 2012/0103779 A1 * | 5/2012 | Hsu et al. | ....................... | 200/600 |
| 2012/0306806 A1 * | 12/2012 | Yang et al. | ..................... | 345/174 |
| 2013/0100066 A1 * | 4/2013 | Doorenbos | ................... | 345/174 |
| 2013/0333922 A1 * | 12/2013 | Kai et al. | ....................... | 174/250 |
| 2014/0008203 A1 * | 1/2014 | Nathan et al. | ................. | 200/600 |

FOREIGN PATENT DOCUMENTS

| | | | | |
|---|---|---|---|---|
| EP | 2 241 960 A1 | 10/2010 | | |
| JP | WO 2012/147948 A1 * | 11/2012 | ............. | G06F 3/045 |
| WO | WO 2012/1479948 | * 11/2012 | ............. | G06F 3/045 |

OTHER PUBLICATIONS

Machine Translation of WO 2012/147948, Kai et al. Nov. 1, 2012.*

* cited by examiner

*Primary Examiner* — Dwayne Bost
*Assistant Examiner* — Christopher Kohlman
(74) *Attorney, Agent, or Firm* — Harrington & Smith (57) ABSTRACT

An apparatus including: an first electrode arrangement including a plurality of electrodes configured for use in detecting a location of a user input; a second electrode arrangement configured for use in detecting strain; and an inter-electrode layer extending between the first electrode arrangement and the second electrode arrangement.

16 Claims, 5 Drawing Sheets

FIG. 11C

APPARATUS AND METHOD FOR DETECTING USER INPUT

TECHNOLOGICAL FIELD

Embodiments of the present invention relate to an apparatus and method for detecting user input.

BACKGROUND

Man machine interfaces (MMI), also known as user interfaces (UI), are used to enable a human user to provide user input to an apparatus.

A touch panel may comprise a plurality of electrodes configured for use in detecting a location of a user input made by the user touching the touch panel with a finger.

BRIEF SUMMARY

According to various, but not necessarily all, embodiments of the invention there is provided an apparatus comprising: a first electrode arrangement comprising a plurality of electrodes configured for use in detecting a location of a user input; a second electrode arrangement; and an inter-electrode layer extending between the first electrode arrangement and the second electrode arrangement, wherein the first electrode arrangement and the second electrode arrangement are configured for use in detecting strain.

According to various, but not necessarily all, embodiments of the invention there is provided a method comprising: using a first electrode arrangement comprising a plurality of electrodes when detecting a location of a user input; and using a second electrode arrangement, separated from the first electrode arrangement by an inter-electrode layer, and the first electrode arrangement when detecting strain.

According to various, but not necessarily all, embodiments of the invention there is provided a method comprising: using first electrodes and second electrode to detect co-ordinates of a location of a user input; wherein the first electrodes and the second electrodes are positioned above an electrode and piezoelectric layer; using the electrode and the piezoelectric layer, in combination with at least some of the first electrodes, at least some of second electrodes or at least some of first electrodes and second electrodes, to detect strain.

According to various, but not necessarily all, embodiments of the invention there is provided an apparatus comprising: a first electrode arrangement comprising a plurality of electrodes; a second electrode arrangement; an inter-electrode layer extending between the first electrode arrangement and the second electrode arrangement; and circuitry configured to detect a location of a user input using the first electrode arrangement and to detect strain using both the first electrode arrangement and the second electrode arrangement.

According to various, but not necessarily all, embodiments of the invention there is provided an apparatus comprising: a first electrode arrangement comprising a plurality of electrodes; a second electrode arrangement; and an inter-electrode layer extending between the first electrode arrangement and the second electrode arrangement, wherein the apparatus has: a first mode in which the plurality of electrodes are configured as independent electrodes for use in detecting a location of a user input and a second mode in which the plurality of electrodes are configured as a combined electrode for use, with the second electrode arrangement, in detecting strain.

BRIEF DESCRIPTION

For a better understanding of various examples of embodiments of the present invention reference will now be made by way of example only to the accompanying drawings in which.

DETAILED DESCRIPTION

The Figures illustrate [insert main independent claim with reference numerals] An apparatus 2 comprising: a first electrode arrangement 4 comprising a plurality of electrodes 11 configured for use in detecting a location of a user input 3; a second electrode arrangement 6 configured for use in detecting strain; and an inter-electrode layer 8 extending between the first electrode arrangement 4 and the second electrode arrangement 6.

The inter-electrode layer 8 is a layer that is positioned between the first electrode arrangement 4 and the second electrode arrangement 6. It is not itself an electrode but is a layer positioned between electrodes.

Figure 1:
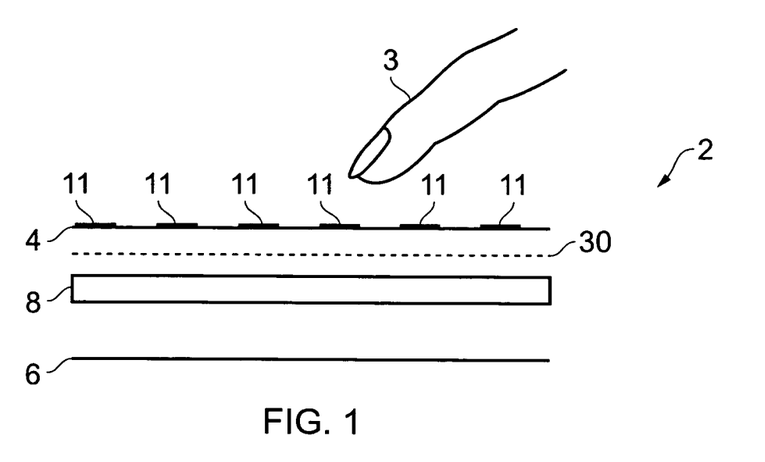
FIG. 1 illustrates an example of an apparatus for detecting both a location of a user input and strain caused by that user input.

FIG. 1 illustrates an example of an apparatus 2 for detecting both a location of a user input 3 and strain caused by that user input 3.

The user input may be made by bringing a user input object close to the first electrode arrangement 4. The user input object may be a user's finger or some other conductive/grounded object.

The apparatus 2 comprises: a first electrode arrangement 4, in an upper level, comprising a plurality of electrodes 11 configured for use in detecting a location of a user input 3; a second electrode arrangement 6, in a lower level, configured for use in detecting strain caused by the user input 3; and an inter-electrode layer 8 extending between the first electrode arrangement 4 and the second electrode arrangement 6 at an intermediate level between the upper level and the lower level.

The first electrode arrangement 4 and the second electrode arrangement 6 may be used to detect, separately, a location of a user input 3 using at least the first electrode arrangement 4 and strain. The first electrode arrangement 4, but not the second electrode arrangement 6, may be used to detect the location of a user input 3.

Figure 2:
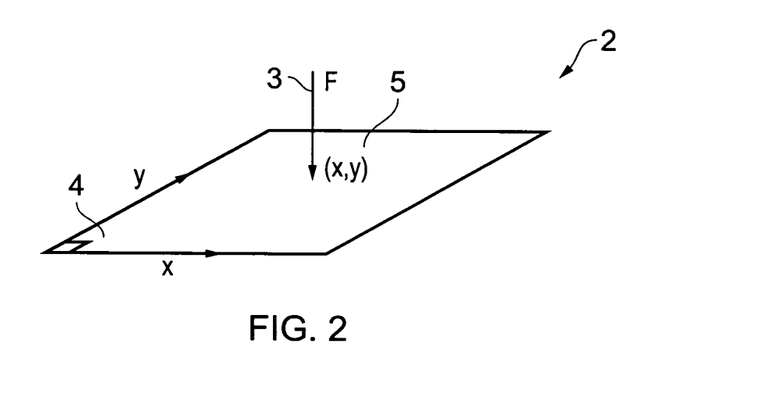
FIG. 2 illustrates a perspective view of a plane formed by an example of the first electrode arrangement and also illustrates a user input at a location with a force F.

FIG. 2 illustrates a perspective view of a plane formed by the first electrode arrangement 4. This figure illustrates that the user input 3 occurs at a location 5 with a force F. The location 5 of the user input 3 is constrained, in dependence on the user input, in a first direction (e.g. X-direction) and is constrained, in dependence on the user input, in at least a second direction (e.g. Y-direction) different to the first direction. In this example, the first direction and the second direction are orthogonal vectors (x, y) defining a multi-component co-ordinate (X, Y) system. The location 5 of the user input 3 may be defined as separate components X, Y of one or more adjacent multi-component co-ordinates (X, Y). The component X is the component of the vector x and the component Y is the component of the vector y. The vectors x and y span the vector space defined by the plane of the first electrode arrangement 4. In this example, the vectors x and y are orthogonal and the location 5 is defined by Cartesian coordinates (X, Y)

Figure 3:
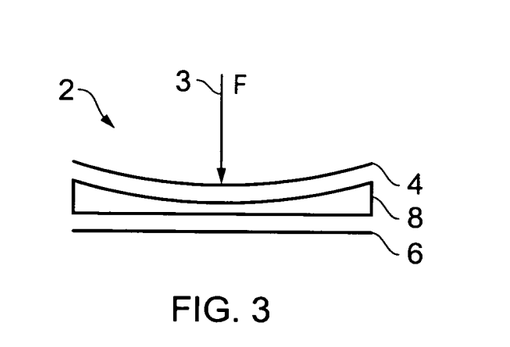
FIG. 3 illustrates an example of the apparatus in which the first electrode arrangement and the inter-electrode layer are flexible and deform in response to the force F.
Figure 4:
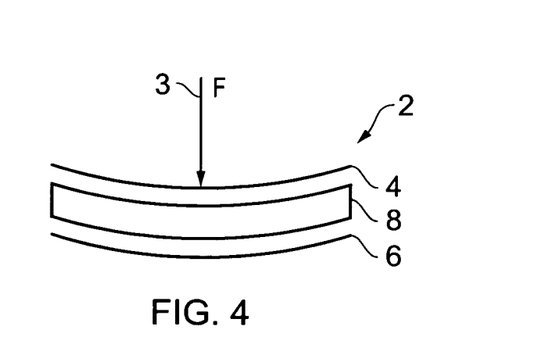
FIG. 4 illustrates an example of the apparatus in which the first electrode arrangement, the inter-electrode layer and the second electrode arrangement are flexible and deform in response to the force F.

The inter-electrode layer 8 is configured to respond to strain caused by the user input 3. As illustrated in FIGS. 3 and 4, when the user input 3 applies a force F the apparatus 2 is strained.

In the example of FIG. 3, the first electrode arrangement 4 and the inter-electrode layer 8 are flexible and deform in response to the force F. In the example of FIG. 4, the first electrode arrangement 4, the inter-electrode layer 8 and the second electrode arrangement 6 are flexible and deform in response to the force F.

A voltage measured between the first electrode arrangement 4 and the second electrode arrangement 6 changes as a consequence of the deformation.

In one example, the combination of first electrode arrangement 4, second electrode arrangement 6 and inter-electrode layer 8 operate as a capacitor with the first and second electrode arrangements providing plates of the capacitor and the inter-electrode layer 8 providing the dielectric of the capacitor. The capacitance of the capacitor changes with deformation of the dielectric and may be detected and/or measured.

In another example, the combination of first electrode arrangement 4, second electrode arrangement 6 and inter-electrode layer 8 operate as a piezoelectric sensor with the first and second electrode arrangement providing electrodes of the sensor and the inter-electrode layer 8 providing the piezoelectric material of the sensor. The voltage between the first electrode arrangement 4 and the second electrode arrangement 6 changes with deformation of the piezoelectric material and may be detected and/or measured. Any suitable piezoelectric material may be used. One example is lead zirconate titanate (PZT).

Referring back to FIG. 1, the second electrode arrangement 6 may comprise a large single electrode. It may be permanently configured as a single electrode.

Figure 5:
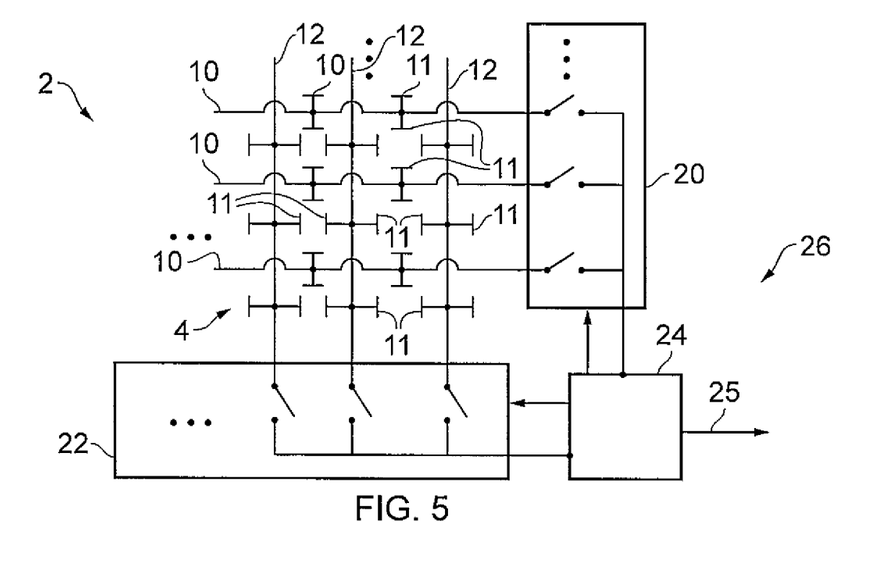
FIG. 5, illustrates an example of a first electrode arrangement comprising electrodes.

FIG. 5, illustrates an example of a first electrode arrangement 4 comprising electrodes 11. In this example, but not necessarily all examples, the electrodes 11 of the first electrode arrangement 4 are arranged in a regular array.

Each electrode 11 may be controlled, in use, to form a plate of a capacitor. The charge transfer at that plate changes when a user input object comes close. This self-capacitance effect may be used to measure touch at a point if the electrode is independently addressed. Alternatively this self-capacitance effect may be used to measure touch at a location along a line if the electrode 11 is one of multiple electrodes 11 connected in series, along that line, that are addressed simultaneously. The multiple electrodes 11 that are connected in series may, for example, form a row electrode 10 or a column electrode 12.

Alternatively each electrode 11 may be controlled, in use, to form a plate of a capacitor, where an adjacent electrode 11 forms the other plate of the capacitor. The charge transfer at those pair of plates changes when a user input object comes close. This mutual-capacitance effect may be measured by using one of the pair of plates as a transmitter of a charge pulse and the other of the pair of plates as a receiver. A change in mutual-capacitance between a pair of electrodes can be used to detect touch at a point corresponding to that pair of electrodes. Detection may, for example, be achieved by independently addressing each pair of electrodes forming a mutual capacitor. Alternatively one of the electrodes in the pair may be one of multiple electrodes 11 connected in series along a row (e.g. forming a row electrode 10) and the other one of the electrodes in the pair may be one of multiple electrodes 11 connected in series along a column (e.g. forming a column electrode 12). A change in the mutual capacitance between a particular row electrode 10 and a particular column electrode 12 identifies the point (node) where the row electrode 10 and the column electrode 12 cross as a location of the touch input. Each combination of row electrode 10 and column electrode 12 may detect a touch input over a sensing area positioned at the point (node) where they cross. The size of touch input may be such that it overlaps one or multiple adjacent sensing areas associated with multiple adjacent crossing points (nodes).

Considering the example where the size of touch input is such that it overlaps multiple adjacent sensing areas associated with multiple adjacent crossing points (nodes), the touch input, in this example, therefore has a location defined by the multiple adjacent crossing points (nodes) defined by the particular combinations of row electrodes 10 and column electrodes 12 that have a detected change in mutual capacitance.

The detected location of the touch input is constrained by the multiple adjacent crossing points (nodes) to form an isolated 'island'. The particular combinations of row electrodes 10 and column electrodes 12 that have a detected change in mutual capacitance represent a sub-set of all the row electrodes 10 and a sub-set of all the column electrodes. The sub-sets are dependent on the size and location of the touch input.

Each electrode 11 is either comprised in a row electrode 10 or a column electrode 12.

Each row electrode 10 comprises electrodes 11 that are serially interconnected along a row. In this example there are M electrodes in each row electrode 10 and there are N parallel row electrodes. The row electrodes 10 are arranged to be used in resolving the Y component of the location 5 of the user input 3.

Each column electrode 12 comprises electrodes 11 that are serially interconnected along a column. In this example there are N electrodes in each column electrode 12 and there are M parallel column electrodes. The column electrodes 12 are arranged to be used in resolve the X component of the location 5 of the user input 3.

Figure 6:
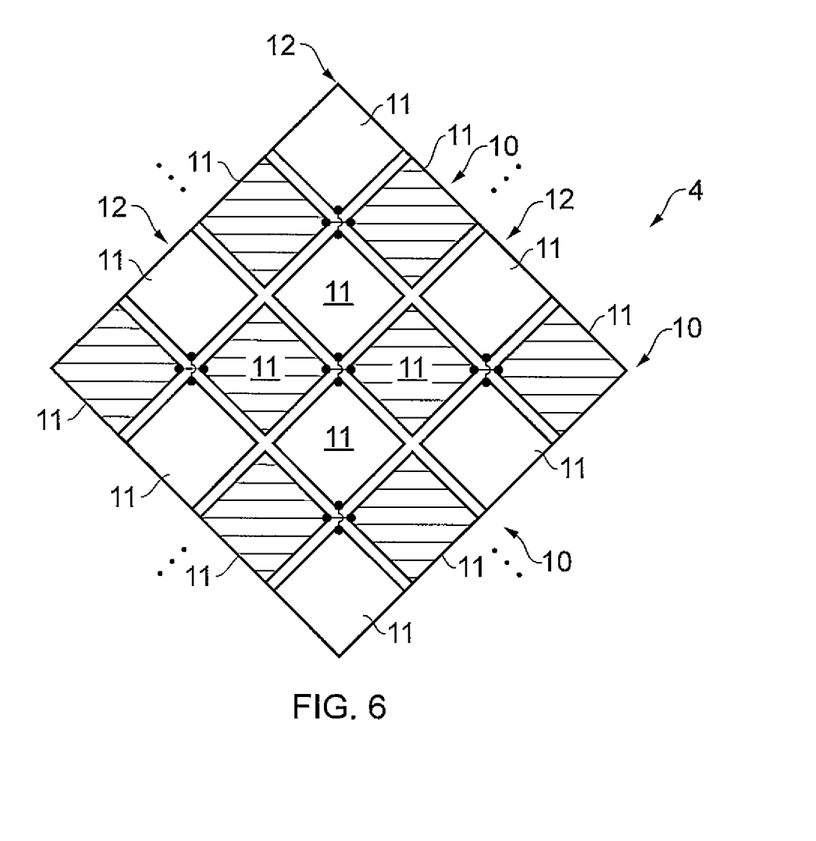
FIG. 6, illustrates an example of a first electrode arrangement comprising capacitive electrodes.

An example of the first electrode arrangement 4 is illustrated in FIG. 6. The electrodes 11 are sized and arranged to utilize edge to edge capacitance between row electrodes 10 (hatched in FIG. 6) and column electrodes 12 (un-hatched in FIG. 6).

The row electrodes 10 are arranged in parallel rows of permanently serially interconnected electrodes 11. The rows extend in the x direction and are separated in the y direction orthogonal to the x direction.

The column electrodes 12 are arranged in parallel columns of permanently serially interconnected electrodes 11. The columns extend in the y direction and are separated in the x direction orthogonal to the y direction.

The apparatus 2 comprises circuitry 26 configured to control the first electrode arrangement 4 and to take measurements from the first electrode arrangement 4.

The circuitry 26 comprises row circuitry 20 and also column circuitry 22. It also comprises control and measurement circuitry 24.

The row circuitry 20 and column circuitry 22 are configured to use the row electrodes 10 as transmitters and the column electrodes as receivers for mutual capacitance measurement. This mutual capacitance measurement may be used to detect a co-ordinates X and Y of a location (X,Y) of a user input 3. The transmitting electrodes are driven row by row and during each drive pulse all the receiving electrodes are simultaneously read.

In an alternative implementation, the row electrodes 10 are used as receivers and the column electrodes 12 are used as transmitters. Then the transmitting electrodes are driven column by column and during each drive pulse all the receiving electrodes are simultaneously read.

The control circuitry 24 is coupled to the row circuitry 20 and the column circuitry 22 and produces, in a first mode, an output 25 indicative of the location 5 of the user input 3 and, in a second mode, an output 25 indicative that a force F has been applied by the user input 3. It may or may not quantify the force depending upon implementation.

The control circuitry 24 provides control outputs to the row circuitry 20 and to the column circuitry 22.

Figure 9:
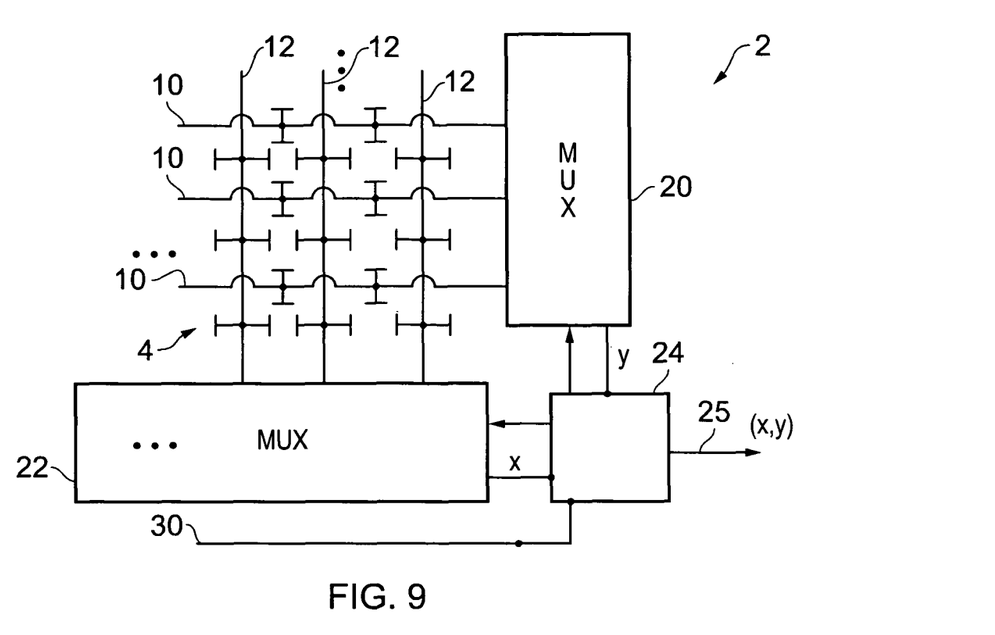
FIG. 9, illustrates an example of the first electrode arrangement, illustrated in FIG. 5, during a first mode.

Referring to FIG. 9, in the first mode, the control circuitry 24 controls the row circuitry 20, using a control output, to drive each row electrode 10 independently as a transmitter.

The row circuitry 20 operates in the first mode as a multiplexer that detects the Y component of a location 5 where a user input 3 occurs.

In the first mode, the control circuitry 24 also controls the column circuitry 22, using a control output, to sense each column electrode 12 independently. The column circuitry 22 operates in the first mode as a multiplexer that detects the X component of the location 5 where a user input 3 occurs.

The control circuitry 24 produces the coordinate (X, Y) as the output 25.

Figure 10:
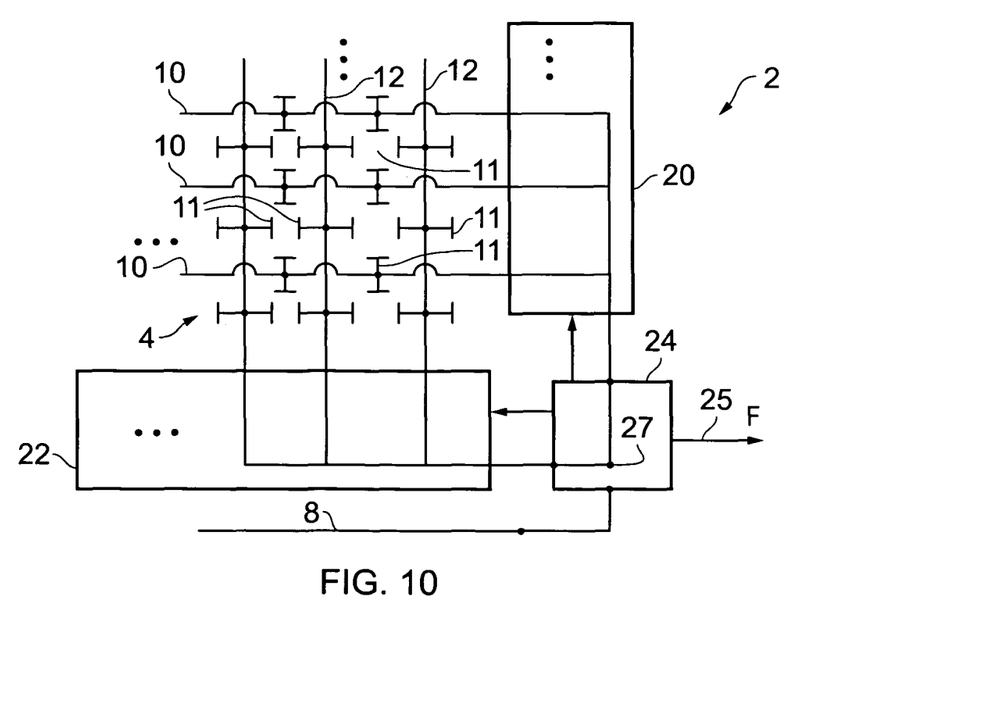
FIG. 10, illustrates an example of the first electrode arrangement, illustrated in FIG. 5, during a second mode.

Referring to FIG. 10, in a second mode, the control circuitry 24 controls the row circuitry 20, using a control output, to interconnect the row electrodes 10 and controls the column circuitry 22, using a control output, to interconnect the column electrodes 12. The control circuitry 24 operates to interconnect the interconnected row electrodes 20 and the interconnected column electrodes 12 and sense a single combined value 27 for the first electrode arrangement 4.

The control circuitry 24 is thus configured, in the second mode, to sense simultaneously multiple row electrodes 10 and/or multiple column electrodes 12. In the described example, it is configured, in the second mode, to sense all of the electrodes 11. The first electrode arrangement 4 operates as a single combined electrode.

The control circuitry 24 is also configured to process the combined value 27 and a signal provided by the second electrode arrangement 6 to produce an output 25 indicative that a force F has been applied by the user input and/or indicative of a magnitude of the force F applied.

It will be appreciated from this explanation that the first electrode arrangement 4 changes configuration.

In the first mode, the first electrode arrangement 4 has a first configuration. In the first configuration the first electrode arrangement 4 comprises distinct row electrodes 10 and column electrodes 12.

In the second mode, the first electrode arrangement 4 has a second configuration. In the second configuration, the first electrode arrangement 4 comprises a combined electrode that combines electrodes 11 not combined in the first mode. For example, all of the row electrodes 10 and column electrodes 12 may be combined as a single electrode.

Thus the first electrode arrangement 4 may be configured as multiple smaller electrodes in the first mode and configured as a larger combined electrode in the second mode.

Although, the first electrode arrangement 4 is configured as a single electrode in the second mode in this example, in other examples it may be configured as one or more electrodes.

The control circuitry 24 may be configured to switch between the first mode for location detection of a user input 3 and the second mode for strain detection.

A trigger for switching from the first mode for location detection of a user input 3 to the second mode for strain detection may be detection of a location of a user input 3 in the first mode.

A trigger for switching from the second mode to the first mode may be detection of a strain caused by the user input 3 or the elapsing of a predetermined period of time without detection of a strain.

In the first mode, the control circuitry 24 uses the first electrode arrangement 4 but not the second electrode arrangement 6 to detect location 5 of a user input 3.

In the second mode, the control circuitry 24 uses both the first electrode arrangement 4 and the second electrode arrangement 6 to detect strain.

Figure 7:
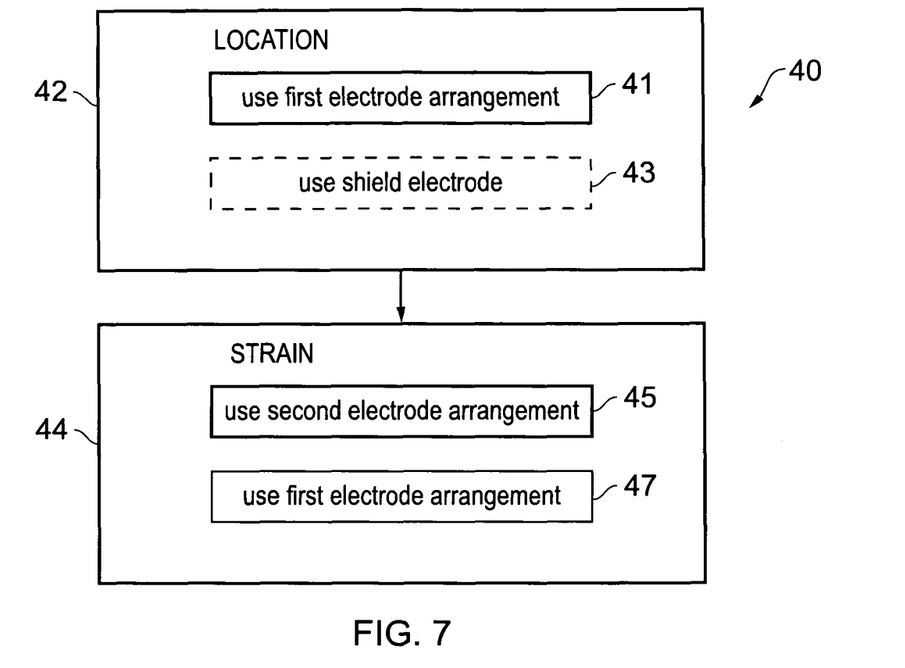
FIG. 7 illustrates, as an example, a method.

FIG. 7 illustrates a method 40 comprising: at block 42 using, at sub-block 41, a first electrode arrangement 4 comprising a plurality of electrodes 11 when detecting a location of a user input 3; and at block 44, using, at sub-block 45, at least a second electrode arrangement 6, separated from the first electrode arrangement 4 by an inter-electrode layer 8, when detecting strain.

Referring to block 44, it comprises not only, sub-block 45, for using the second electrode arrangement 6 when detecting strain but also sub-block 47 for using the first electrode arrangement 4 when detecting strain. Strain is detected (or measured) by sensing the voltage between a combined electrode of the first electrode arrangement 4 and the electrode of the second electrode arrangement 6.

Referring to block 42, the first electrode arrangement 4 but not the second electrode arrangement 6 is used when detecting location of a user input 3.

The same electrodes 11 of the first electrode arrangement 4, in different configurations, are used to detect strain and to detect location of a user input 3. The electrodes 11 are used as distinct multiple electrodes (e.g. row electrodes 10 and column electrodes 12) to resolve a location 5 of a user input 3. The electrodes 11 are used as a combined electrode to detect/measure strain.

Figure 8:
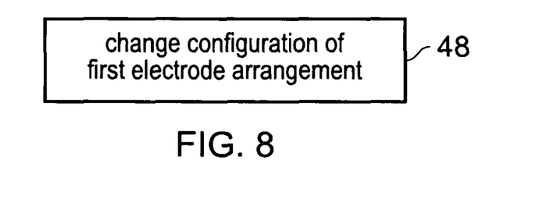
FIG. 8 illustrates, as an example, mode switching.

FIG. 8 illustrates that at block 48 the configuration of the first electrode arrangement 4 may be changed between the first configuration to detect a location of a user input 3 and the second configuration to detect strain caused by the user input 3.

FIG. 1 illustrates that the apparatus 2 may optionally comprise a shield electrode 30 located between the first electrode arrangement 4 and the inter-electrode layer 8 and electrically insulated from both.

Referring to sub-block 43 of FIG. 7 in the first mode, when the first electrode arrangement is in the first configuration, the control circuitry 24 is configured to apply a constant potential, such as for example a ground potential, to the shield electrode 30.

The control circuitry 24 is configured to de-couple the shield electrode 30 in the second mode so that its potential can freely vary (float).

In the first mode, the shield electrode 30 prevents interference at the first electrode arrangement 4 from the inter-electrode layer 8 and any other underlying sources of electric field distortion.

Figure 11A:
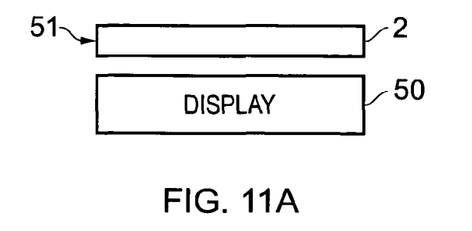
FIG. 11A illustrates, as an example, an apparatus embodied as a touch panel module.

FIG. 11A illustrates the apparatus 2 embodied as a touch panel module 51. The touch panel module 51 is configured to overlie a display 50. The apparatus 2 may further comprise a flexible, transparent protective outer layer.

In this example, the components of the apparatus 2 that overlie the display 50 are transparent. The first electrode arrangement 4 is transparent, the second electrode arrangement 6 is transparent; and the inter-electrode layer 8 is transparent.

Figure 11B:
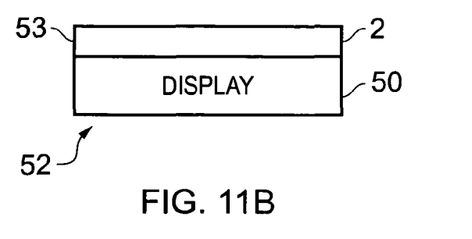
FIG. 11B illustrates, as an example, an apparatus embodied as a touch panel as part of a touch sensitive display module.

FIG. 11B illustrates the apparatus 2 embodied as a touch panel 53 as part of a touch sensitive display module 52. The touch panel 53 is joined to a display 50 to form the touch sensitive display module 52. The apparatus 2 may further comprise a flexible, transparent protective outer layer.

In this example, the components of the apparatus 2 that overlie the display 50 are transparent. The first electrode arrangement 4 is transparent, the second electrode arrangement 6 is transparent; and the inter-electrode layer 8 is transparent.

Figure 11C:
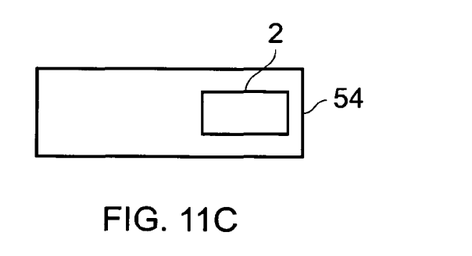
FIG. 11C illustrates, as an example, the apparatus embodied as a component in an electronic device.

FIG. 11C illustrates the apparatus 2 embodied as a component in an electronic device 54. The electronic device may, for example, be a hand-portable electronic device.

In this example, the components of the apparatus 2 that overlie a display 50 (if any) are transparent. The first electrode arrangement 4, the second electrode arrangement 6; and the inter-electrode layer 8 may be transparent.

It will be appreciated from the foregoing that first electrodes (row electrodes 10) may be used to detect a first co-ordinate of a location of a user input 3; and that second electrodes (column electrodes 12) may be used to detect a second co-ordinate of a location of a user input 3. The first electrodes and the second electrodes are positioned above an electrode 6 and piezoelectric layer 8 used, in combination with at least some of the first electrodes and/or second electrodes, to detect strain.

As used here 'module' refers to a unit or apparatus that excludes certain parts/components that would be added by an end manufacturer or a user. The illustration of a particular order to the blocks in FIG. 7 does not necessarily imply that there is a required or preferred order for the blocks and the order and arrangement of the block may be varied. Furthermore, it may be possible for some blocks to be omitted.

In some but not necessarily all embodiments the apparatus 2 may comprise: a first electrode arrangement 4 comprising a plurality of electrodes 11; a second electrode arrangement 6; an inter-electrode layer 8 extending between the first electrode arrangement 4 and the second electrode arrangement 6; and circuitry 24 configured to detect a location of a user input 3 using (only) the first electrode arrangement 4 and to detect strain using both the first electrode arrangement 4 and the second electrode arrangement 6.

In some but not necessarily all embodiments the apparatus 2 may comprise: a first electrode arrangement 4 comprising a plurality of electrodes 11; a second electrode arrangement 6; and an inter-electrode layer 8 extending between the first electrode arrangement 4 and the second electrode arrangement 6, wherein the apparatus 2 has: a first mode in which the plurality of electrodes 11 are configured as independent electrodes for use in detecting a location of a user input and a second mode in which the plurality of electrodes are configured as a combined electrode for use, with the second electrode arrangement 6, in detecting strain.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a first electrode arrangement comprising a plurality of electrodes configured for use in detecting a location of a user input;
a second electrode arrangement;
an inter-electrode layer extending between the first electrode arrangement and the second electrode arrangement, wherein the inter-electrode layer comprises a piezoelectric material;
wherein the first electrode arrangement, the second electrode arrangement, and the inter-electrode layer are configured to operate as a piezoelectric sensor for use in detecting strain, wherein the apparatus is configured to detect a change in voltage between the first electrode arrangement and the second electrode arrangement in response to a deformation of the piezoelectric material;
wherein the first electrode arrangement comprises row electrodes arranged in parallel rows and column electrodes arranged in parallel columns, wherein the row electrodes and the column electrodes are at a same level, and wherein a control circuitry is configured to interconnect the row electrodes and the column electrodes; and
circuitry configured to switch between a first mode for location detection of a user input and a second mode for strain detection, wherein the first electrode arrangement has a variable configuration and is configured as multiple smaller electrodes in the first mode and is configured as one or more larger electrodes in the second mode.

2. An apparatus as claimed in claim 1, wherein the first electrode arrangement is configured to detect the location of a user input as separate components of at least a multi-component co-ordinate.

3. An apparatus as claimed in claim 1, wherein the inter-electrode layer is configured to respond to strain caused by a user input.

4. An apparatus as claimed in claim 1, wherein the second electrode arrangement comprises a large single electrode.

5. An apparatus as claimed in claim 1, comprising circuitry configured to detect, separately, a location of a user input using at least the first electrode arrangement and strain using both the first electrode arrangement and the second electrode arrangement.

6. An apparatus as claimed in claim 1, comprising circuitry configured to use the first electrode arrangement but not the second electrode arrangement to detect a location of a user input.

7. An apparatus as claimed in claim 1, comprising circuitry configured, in the first mode, to use only the first electrode arrangement and not the second electrode arrangement and configured, in the second mode, to use both the first electrode arrangement and the second electrode arrangement to detect strain.

8. An apparatus as claimed in claim 1, further comprising a shield electrode located between the first electrode arrangement and the inter-electrode layer and comprising circuitry configured to apply a constant potential to the shield electrode in the first mode.

9. An apparatus as claimed in claim 1, wherein the
first electrode arrangement is flexible,
the second electrode arrangement is flexible; and
the inter-electrode layer is flexible.

10. An apparatus as claimed in claim 1, wherein the
first electrode arrangement is transparent,
the second electrode arrangement is transparent; and
the inter-electrode layer is transparent.

11. An apparatus as claimed in claim 1, embodied as a touch panel module.

12. An apparatus as claimed in claim 1, further comprising a display.

13. A method comprising:
using a first electrode arrangement comprising a plurality of electrodes when detecting a location of a user input;
using a second electrode arrangement, separated from the first electrode arrangement by an inter-electrode layer, and the first electrode arrangement when detecting strain, wherein the inter-electrode layer comprises a piezoelectric material, wherein the first electrode arrangement, the second electrode arrangement, and the inter-electrode layer are configured to operate as a piezoelectric sensor for use in detecting strain, wherein the apparatus is configured to detect a change in voltage between the first electrode arrangement and the second electrode arrangement in response to a deformation of the piezoelectric material;
wherein the first electrode arrangement comprises row electrodes arranged in parallel rows and column electrodes arranged in parallel columns, wherein the row electrodes and the column electrodes are at a same level, and wherein a control circuitry is configured to interconnect the row electrodes and the column electrodes; and
using circuitry configured to switch between a first mode for location detection of a user input and a second mode for strain detection, wherein the first electrode arrangement has a variable configuration and is configured as multiple smaller electrodes in the first mode and is configured as one or more larger electrodes in the second mode.

14. A method as claimed in claim 13, comprising: using the first electrode arrangement but not the second electrode arrangement when detecting location of a user input.

15. A method as claimed in claim 13 comprising: using the same electrodes of the first electrode arrangement, in different configurations, to detect strain and to detect location of a user input.

16. An apparatus comprising:
a first electrode arrangement comprising a plurality of electrodes;
a second electrode arrangement; and
an inter-electrode layer extending between the first electrode arrangement and the second electrode arrangement, wherein the inter-electrode layer comprises a piezoelectric material, wherein the first electrode arrangement, the second electrode arrangement, and the inter-electrode layer are configured to operate as a piezoelectric sensor for use in detecting strain, wherein the apparatus is configured to detect a change in voltage between the first electrode arrangement and the second electrode arrangement in response to a deformation of the piezoelectric material;
wherein the first electrode arrangement comprises row electrodes arranged in parallel rows and column electrodes arranged in parallel columns, wherein the row electrodes and the column electrodes are at a same layer, and wherein a control circuitry is configured to interconnect the row electrodes and the column electrodes,
wherein the apparatus has:
a first mode in which the plurality of electrodes are configured as independent electrodes for use in detecting a location of a user input and
a second mode in which the plurality of electrodes are configured as a combined electrode for use, with the second electrode arrangement, in detecting strain;
wherein the apparatus further comprises circuitry configured to switch between the first mode and the second mode, wherein the first electrode arrangement has a variable configuration and is configured as multiple smaller electrodes in the first mode and is configured as one or more larger electrodes in the second mode.

* * * * *